United States Patent
Onodera (10) Patent No.: US 9,393,626 B2
(45) Date of Patent: Jul. 19, 2016

(54) CUTTING INSERT, CUTTING TOOL, AND METHOD OF MANUFACTURING MACHINED PRODUCT

(71) Applicant: KYOCERA Corporation, Kyoto-shi, Kyoto (JP)

(72) Inventor: Chie Onodera, Omihachiman (JP)

(73) Assignee: Kyocera Corporation, Kyoto-Shi, Kyoto (JP)

( * ) Notice: Subject to any disclaimer, the term of this patent is extended or adjusted under 35 U.S.C. 154(b) by 18 days.

(21) Appl. No.: 14/388,970

(22) PCT Filed: Mar. 27, 2013

(86) PCT No.: PCT/JP2013/059038
§ 371 (c)(1),
(2) Date: Sep. 29, 2014

(87) PCT Pub. No.: WO2013/146899
PCT Pub. Date: Oct. 3, 2013

(65) Prior Publication Data
US 2015/0090081 A1   Apr. 2, 2015

(51) Int. Cl.
*B23C 5/00* (2006.01)
*B23B 27/14* (2006.01)
*B23B 27/00* (2006.01)

(52) U.S. Cl.
CPC ....... *B23B 27/143* (2013.01); *B23B 2200/0447* (2013.01); *B23B 2200/081* (2013.01); *Y10T 82/10* (2015.01); *Y10T 407/22* (2015.01); *Y10T 407/245* (2015.01)

(58) Field of Classification Search
CPC ............... B23B 27/143; B23B 27/145; B23B 2200/081; B23B 2200/087; B23B 2200/32; B23B 2200/321; B23B 2200/323; B23B 2200/325
See application file for complete search history.

(56) References Cited

U.S. PATENT DOCUMENTS 5,449,255 A * 9/1995 Katbi ................... B23B 27/143 407/114
5,476,346 A * 12/1995 Lundstrom ........... B23B 27/143 407/114

(Continued)

FOREIGN PATENT DOCUMENTS

EP 1967304 A2 9/2008
EP 2322301 A1 5/2011

(Continued)

OTHER PUBLICATIONS

International Search Report, PCT/JP2013/059038, May 23, 2013, 2 pgs.

*Primary Examiner* — Will Fridie, Jr.
(74) *Attorney, Agent, or Firm* — Volpe and Koenig, P.C.

(57) ABSTRACT

A cutting insert has a polygonal columnar shape and includes an upper surface, a lower surface, a side surface located between the upper surface and the lower surface, and a cutting edge formed at an intersection of the upper surface and the side surface. The upper surface includes a convex-shaped main part including a flat upper end surface, a first projection projecting from the main part to a corner part of the upper surface, a second projection projecting from the first projection toward the corner part, and a pair of third projections respectively projecting from the first projection toward a periphery of the upper surface that interpose at least a part of the second projection between the pair of third projections. A surface of the first projection is an inclined surface curved in a concave shape, and a surface of the second projection is a planar inclined surface.

8 Claims, 7 Drawing Sheets

(56) References Cited

U.S. PATENT DOCUMENTS

| | | | |
|---|---|---|---|
| 7,182,555 B2* | 2/2007 | Kitagawa | B23B 27/141 407/113 |
| 8,251,618 B2* | 8/2012 | Kobayashi | B23B 27/143 407/114 |
| 8,267,623 B2* | 9/2012 | Park | B23B 27/143 407/113 |
| 8,876,441 B2* | 11/2014 | Majima | B23B 27/143 407/113 |
| 8,939,684 B2* | 1/2015 | Chistyakov | B23B 27/045 407/115 |
| 2008/0219784 A1 | 9/2008 | Yamazaki et al. | |
| 2009/0226269 A1* | 9/2009 | Iyori | B23B 27/143 407/114 |
| 2011/0142555 A1* | 6/2011 | Yamazaki | B23B 27/143 407/2 |
| 2012/0275869 A1 | 11/2012 | Yamazaki et al. | |

FOREIGN PATENT DOCUMENTS

| | | |
|---|---|---|
| JP | 2007-301669 A | 11/2007 |
| JP | 2008-213122 A | 9/2008 |
| JP | 2009-208216 A | 9/2009 |
| JP | 2010-69614 A | 4/2010 |

* cited by examiner

CUTTING INSERT, CUTTING TOOL, AND METHOD OF MANUFACTURING MACHINED PRODUCT

TECHNICAL FIELD

The present invention relates to a cutting insert, a cutting tool, and a method of manufacturing a machined product.

BACKGROUND ART

Conventionally, a throw-away cutting tool with a cutting insert attached to a holder has been used as a cutting tool for use in a cutting process or the like. The cutting insert used for the cutting tool generally includes an upper surface, a lower surface, and a side surface. A cutting edge is formed at an intersection of the side surface and at least one of the upper surface and the lower surface. The cutting edge is to be brought into contact with a workpiece being rotated so as to cut the workpiece.

As a cutting insert, Patent Document 1 has proposed a cutting tip having an upper surface thereof projections with which chips of a workpiece are brought into contact. The cutting insert described in Patent Document 1 is capable of curving the chips of the workpiece by bringing the chips into contact with a first projection (first ridge) and a pair of second projections (second ridges) respectively extending from the first projection.

However, with the cutting insert described in Patent Document 1, the chips are brought into contact with the second projections under conditions of large depths of cut, while the chips are not brought into contact with the second projections under conditions of small depths of cut. Moreover, in the cutting insert described in Patent Document 1, consideration is given to a change in depth of cut, but no consideration is given to a change in feed rate.

When the depth of cut is decreased and the feed rate is increased, the chips are easy to flow in a direction inclined from a bisector of a vertical angle. Therefore, the second projections are required to have a large inclination in order to facilitate curving of the chips during machining at small depths of cut and high feed rates. However, the increased inclination of the second projections may cause the problem that during machining at high feed rates, the durability of the second projections is deteriorated or chip packing is apt to occur.

Patent Document 1: Japanese Unexamined Patent Publication No. 2009-208216

SUMMARY OF THE INVENTION

According to one aspect of the present invention, there is provided a cutting insert that has a polygonal plate shape and includes an upper surface, a lower surface, a side surface located between the upper surface and the lower surface, and a cutting edge is formed at an intersection of the upper surface and the side surface. The upper surface includes a convex-shaped main part including a flat upper end surface, a first projection projecting from the main part to a corner part of the upper surface, a second projection projecting from the first projection toward the corner part, and a pair of third projections respectively projecting from the first projection toward a periphery of the upper surface so as to interpose at least a part of the second projection between the pair of third projections. A surface of the first projection is an inclined surface curved in a concave shape, and a surface of the second projection is a planar inclined surface in a portion located on a bisector of the corner part in a top plan view.

PREFERRED EMBODIMENTS FOR CARRYING OUT THE INVENTION

<Cutting Insert>

A cutting insert 1 according to an embodiment is described in detail below with reference to the drawings. For the sake of convenience, the individual drawings to be referred to in the following show in a simplified manner only main members needed for describing the present invention. Hence, the cutting insert 1 according to the present invention may include an optional structural member not shown in the individual drawings referred to in the present description. The dimensions of structural members in each of the drawings are not ones which faithfully plot the actual dimensions of the structural members and the dimensional ratios of the structural members.

As shown in FIGS. 1 to 8, the cutting insert 1 of the present embodiment has an upper surface 3 and a lower surface 5 whose shapes in a top plan view are respectively a square shape, more specifically, a rhombus shape. Four side surfaces 7 are respectively disposed between the upper surface 3 and the lower surface 5, and are respectively connected to the upper surface 3 and the lower surface 5. The upper surface 3 and the lower surface 5 have approximately the same shape so as to be overlapped with each other in the top plan view. Therefore, the four side surfaces 7 respectively located between the upper surface 3 and the lower surface 5 are vertically disposed with respect to the upper surface 3 and the lower surface 5.

The cutting insert 1 is formed in a polygonal plate shape, specifically, a square plate shape by the upper surface 3, the lower surface 5, and the side surfaces 7. Strictly speaking, the upper surface 3 and the lower surface 5 are not the square shape in the cutting insert 1 of the present embodiment. Each of the upper surface 3 and the lower surface 5 has round-shaped corner portions respectively at corner parts 25 in which individual sides that form a square shape intersect each other.

Further, cutting edges 9 are respectively formed at an intersection of the upper surface 3 and the side surface 7, and at an intersection of the lower surface 5 and the side surface 7. That is, in the cutting insert 1 of the present embodiment, the cutting edge 9 is also formed at the intersection of the lower surface 5 and the side surface 7 in addition to the intersection of the upper surface 3 and the side surface 7. Alternatively, the cutting insert 1 may include the cutting edge 9 only at the intersection of the upper surface 3 and the side surface 7.

Although the height of the cutting edge 9 may be constant from the lower surface 5, the cutting edge 9 of the present embodiment is inclined toward the lower surface as a portion of the cutting edge 9 adjacent to a corner cutting edge 9a disposed along the intersection of the corner part 25 and the side surface 7 is spaced apart from the corner cutting edge 9a. This configuration contributes to reducing the cutting resistance of the portion of the cutting edge 9 adjacent to the corner cutting edge 9a, though this portion is used under conditions of large depths of cut.

The lower surface 5 of the cutting insert 1 of the present embodiment, which is not particularly shown, has a similar configuration to that of the upper surface 3. The cutting insert 1, which is configured to dispose the cutting edge 9 at the intersection of the lower surface 5 and the side surface 7 in addition to at the intersection of the upper surface 3 and the side surface 7, is usable by performing a top-bottom inversion of the cutting insert 1.

That is, when the insert 1 is attached to a holder 103 by using the lower surface 5 of the cutting insert 1 as a seating surface, the cutting edge 9 formed at the intersection of the upper surface 3 and the side surface 7 of the cutting insert 1 is usable for a cutting process. When the cutting insert 1 is subjected to the top-bottom inversion so that the cutting insert 1 is attached to the holder 103 by using the upper surface 3 of the cutting insert 1 as the seating surface, the cutting edge 9 formed at the intersection of the lower surface 5 and the side surface 7 of the cutting insert 1 is usable for the cutting process.

Examples of the material of the cutting insert 1 include cemented carbide and cermet. Examples of the composition of cemented carbide include WC-Co produced by adding cobalt (Co) powder to tungsten carbide (WC), followed by sintering, WC-TiC-Co produced by adding titanium carbide (TiC) to WC-Co, and WC-TiC-TaC-Co produced by adding tantalum carbide (TaC) to WC-TiC-Co. Cermet is a sintered composite material obtained by compositing metal with a ceramic ingredient, and specific examples thereof include titanium compounds composed mainly of titanium carbide (TiC) or titanium nitride (TiN).

The surface of the cutting insert 1 may be coated with a coating by using a chemical vapor deposition (CVD) method or a physical vapor deposition (PVD) method. Examples of the composition of the coating includes titanium carbide (TiC), titanium nitride (TiN), titanium carbonitride (TiCN), and alumina ($Al_2O_3$).

The upper surface 3 of the cutting insert 1 of the present embodiment includes a main part 11, a land part 13, and a breaker groove 15. The main part 11 has a convex shape with a flat upper end surface. The main part 11 is located so as to surround a through hole 17 described later. The land part 13 is disposed along a periphery of the upper surface 3 so as to surround the main part 11. That is, the cutting edge 9 is formed at the intersection of the land part 13 and the side surface 7.

The breaker groove 15 is formed between the main part 11 and the land part 13. The height of each of the main part 11 and the land part 13 from the lower surface 5 is higher than the height of a bottom surface of the breaker groove 15 from the lower surface 5. The height of the main part 11 from the lower surface 5 is higher than the height of the land part 13 from the lower surface 5.

When the lower surface 5 is a flat surface, the term "height from the lower surface" denotes a vertical width from the flat surface. When the lower surface 5 has recessed and projecting parts and convexities as in the cutting insert 1 of the present embodiment, the term "height from the lower surface" denotes a vertical width from the flat lower end surface that functions as the seating surface when the insert 1 is attached to the holder 103.

The upper surface 3 further includes a first projection 19 that projects from the main part 11 toward the corner part 25, a second projection 21 that projects from the first projection 19 toward the corner part 25, and a pair of third projections 23 that respectively project from the first projection toward the periphery of the upper surface 3. The pair of third projections 23 are located so as to interpose therebetween at least a part of the second projection 21.

Figure 1:
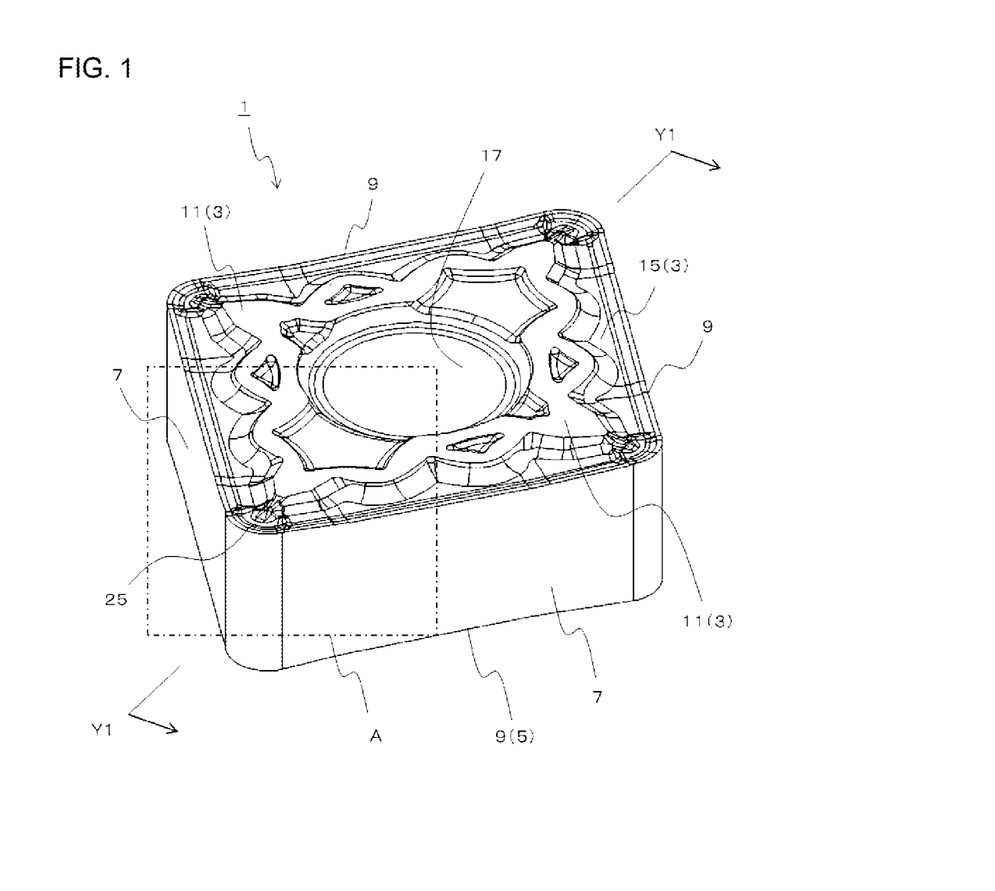
FIG. 1 is a perspective view showing a cutting insert according to a first embodiment of the present invention.
Figure 2:
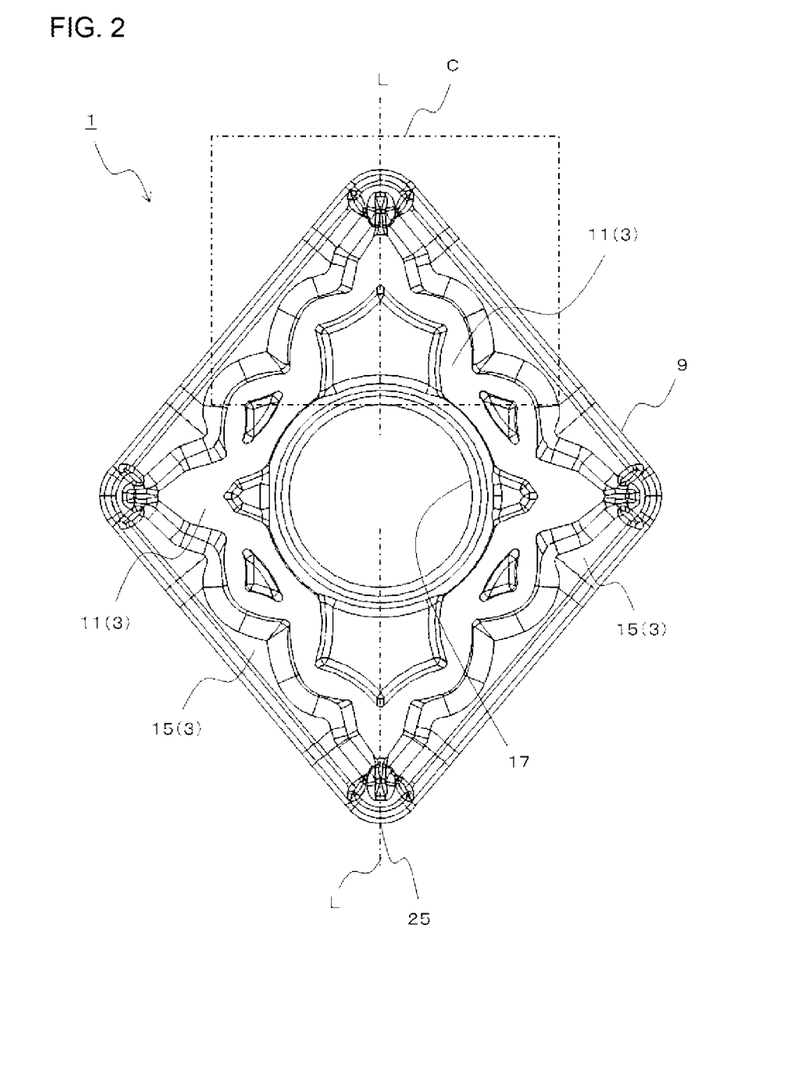
FIG. 2 is a top view of the cutting insert shown in FIG. 1.
Figure 3:
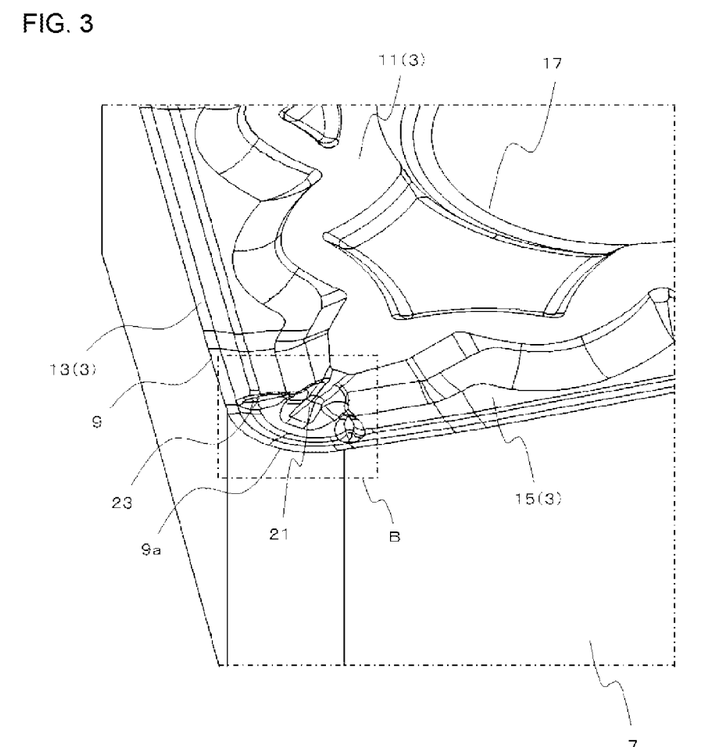
FIG. 3 is an enlarged perspective view showing in enlarged dimension a region A of the cutting insert shown in FIG. 1.
Figure 4:
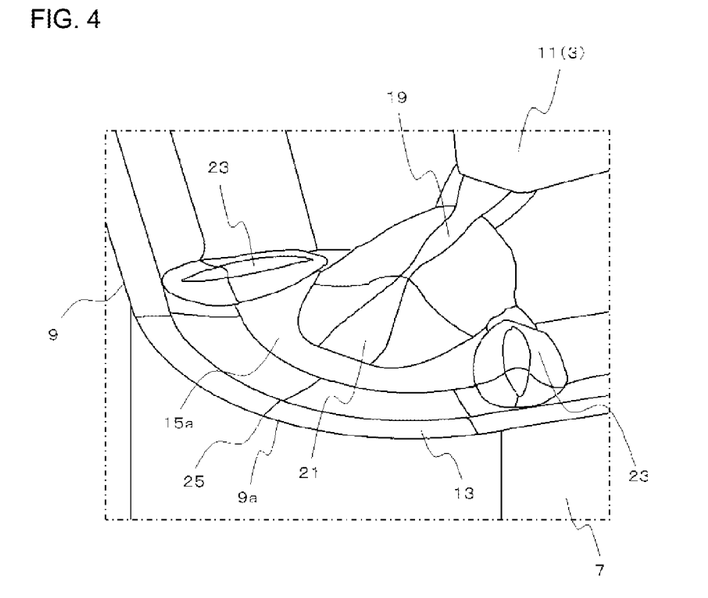
FIG. 4 is an enlarged perspective view showing in further enlarged dimension a region B of the cutting insert shown in FIG. 3.
Figure 6:
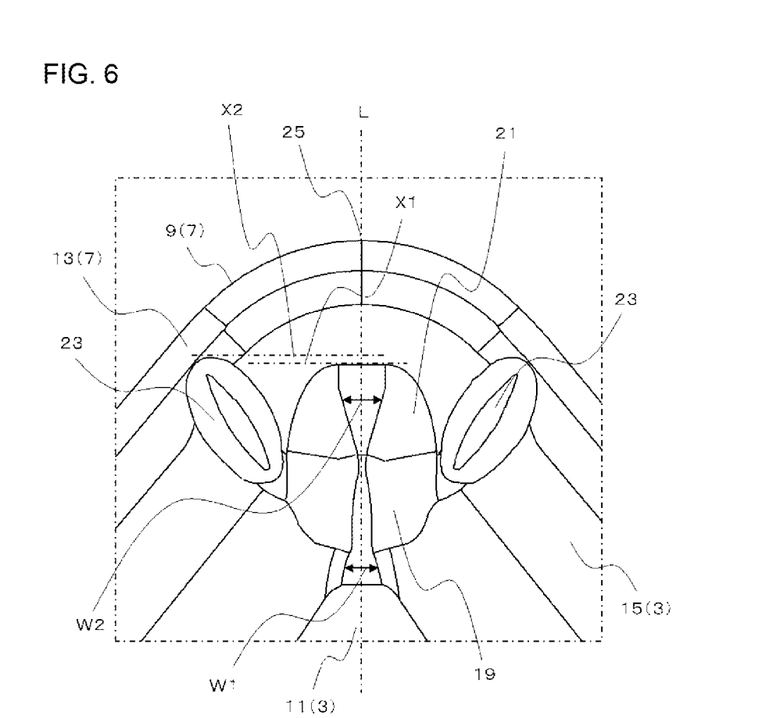
FIG. 6 is an enlarged perspective view showing in further enlarged dimension a region D of the cutting insert shown in FIG. 5.
Figure 7:
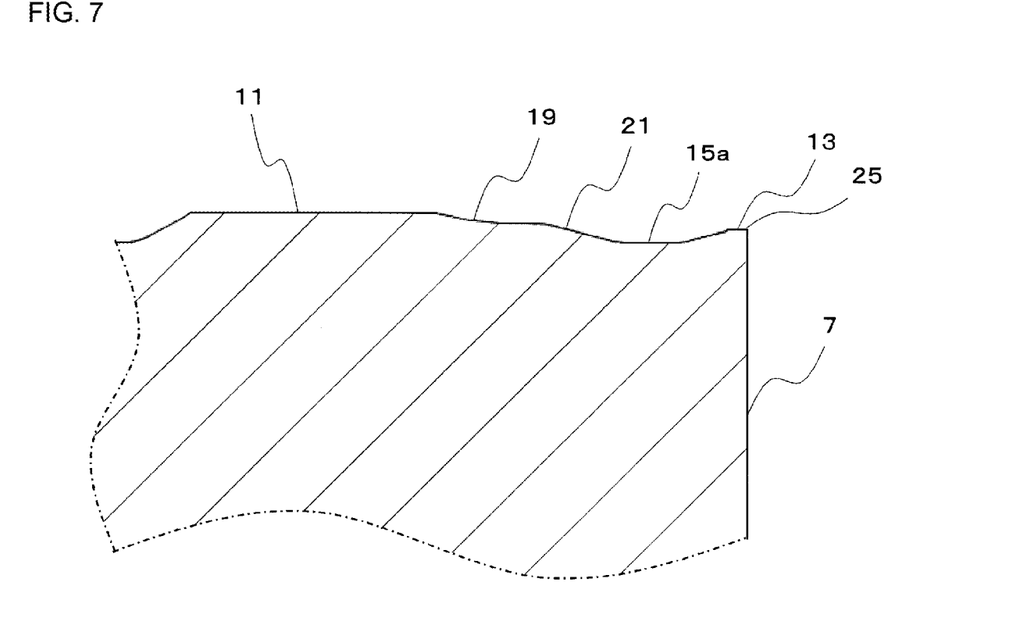
FIG. 7 is an enlarged cross-sectional view showing in enlarged dimension a region including a first projection and a second projection taken along the line Y1-Y1 of the cutting insert shown in FIG. 1.
Figure 8:
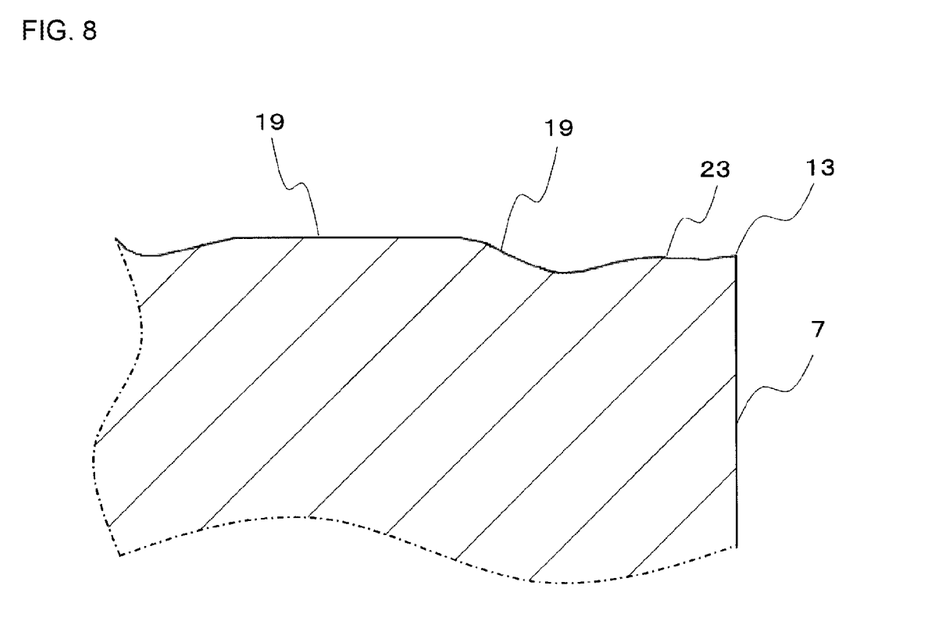
FIG. 8 is an enlarged cross-sectional view showing in enlarged dimension a region including a third projection taken along the line Y2-Y2 of the cutting insert shown in FIG. 5.

In a portion located on a bisector L of the corner part 25 shown in FIGS. 2 and 6, the surface of the first projection 19 is an inclined surface curved in a concave shape, and the surface of the second projection 21 is a planar inclined surface as shown in FIG. 7. The line Y1-Y1 shown in FIG. 1 is located on the bisector L of the corner part 25. The cross-sectional view taken along the line Y1-Y1 shown in FIG. 7 is the cross-sectional view of a cross section that includes the bisector L and is perpendicular to the upper surface 3.

A corner cutting edge 9a is formed at an intersection of the corner part 25 and the upper surface 3. The cutting insert 1 of the present embodiment is suitably used for cutting processes in a wide range of feed rates during machining at small depths of cut in which a workpiece 201 is cut using the region of the corner cutting edge 9a. The cutting insert 1 of the present embodiment is suitably usable for the machining at the small depths of cut, and is also of course usable for machining at large depths of cut.

To be specific, a region including a portion of the surface of the second projection 21 which is located on the bisector L of the corner part 25 is not an inclined surface curved in a concave shape but a planar inclined surface. This configuration ensures that a front end of the second projection 21 has a sufficient thickness than the case where the above-mentioned region is the inclined surface curved in the concave shape. In other words, this configuration ensures a sufficient height of the front end of the second projection 21 from the bottom of the breaker groove 15. This makes it possible to stably bring the chips into contact with the second projection 21 during machining at low feed rates. The chips during the machining at low feed rates have a small thickness, and hence the chips are brought into contact with the planar inclined surface of the second projection 21 so as to be easily curved.

Under conditions of large depths of cut and high feed rates, the thickness of the chips is increased and the chips flow in an inclined direction with respect to the corner cutting edge 9a. Accordingly, the chips are contacted with one of the third projections 23. Specifically, the chips flow toward the third projection 23 of the pair of the third projections 23 which is located away from a portion of the corner cutting edge 9a to be brought into contact with the workpiece 201, and the chips are then contacted with the third projections 23. For example, when the workpiece 201 is brought into contact with the cutting insert 1 from above on the right side in FIGS. 5 and 6, the chips flow toward the third projection 23 of the pair of third projections 23 which is located on the left side. On this occasion, the chips are easily curved by the third projection 23 of the pair of third projections 23 which is located on the left side.

Under conditions of large depths of cut and high feed rates, the chips flow so as to creep up the corner cutting edge 9a and contact with the region including the portion of the first projection 19 which is located on the bisector L of the corner part 25. On this occasion, the surface of the region including the portion of the first projection 19 which is located on the bisector L of the corner part 25 is not a merely inclined surface but the inclined surface curved in the concave shape. This configuration ensures that the chips are deformed along the inclined surface curved in the concave shape though the chips are less deformable because the thickness of the chips is increased due to the high feed rates.

The surface of the above-mentioned region of the second projection 21 is the planar inclined surface, while the surface of the above-mentioned region of the first projection 19 is the inclined surface curved in the concave shape. It is thus ensured to increase a contact area between the chips and the second projection 21 when the chips flow along the inclined surface curved in the concave shape. This ensures stable braking on the chips so as to efficiently divide the chips.

With the foregoing cutting insert 1 of the present embodiment, the first projection 19, the second projection 21, and the third projections 23 are properly used for the regions through which the chips are curved, according to the depth of cut and the feed rate. Therefore, even when the depth of cut and the feed rate are changed, it is ensured that the chips are stably deformed and are easily discharged to the outside.

The cutting insert 1 of the present embodiment includes the through hole 17 that extends between a middle part of the upper surface 3 and a middle part of the lower surface 5. The through hole 17 is disposed to permit insertion of a screw 105 into the through hole 17 when the cutting insert 1 is screwed to the holder 103 of a cutting tool 101. As a method of fixing the cutting insert 1 to the holder 103, a clamp structure may be employed instead of the method of fixing it by screwing.

The term "middle part" denotes a partial region including the center of a plane in a top plan view. For example, when the upper surface 3 has the rhombus shape as in the cutting insert 1 of the present embodiment, a point of intersection of a straight line connecting the corner parts 25 located at opposite ends in a longitudinal direction and a straight line connecting the corner parts 25 located at opposite ends in a direction orthogonal to the longitudinal direction corresponds to the center of the upper surface 3. The through hole 17 is disposed so as to include the center of the upper surface 3.

The main part 11 is located so as to surround the through hole 17. The main part 11 has the flat upper end surface. When the cutting insert 1 is subjected to the top-bottom inversion and is attached to the holder 103 by bringing the upper surface 3 of the cutting insert 1 into contact with the holder 103, the upper end surface of the main part 11 functions as a seating surface.

The first projection 19 projects from the main part 11 toward the corner part 25 of the upper surface 3. The second projection 21 projects from the first projection 19 toward the corner part 25. The pair of third projections 23 respectively project from the first projection toward the periphery of the upper surface 3. Accordingly, in the cutting insert 1 of the present embodiment, the pair of third projections 23 are located so as to interpose therebetween at least the part of the second projection 21. In other words, at least the part of the second projection projects in the region surrounded by the pair of third projections 23. The above-mentioned configuration of the second projection 21 ensures that the chips are stably brought into contact with the second projection 21 during the machining at the low feed rates.

The pair of third projections 23 are located so as to interpose therebetween a straight line connecting the second projection 21 and the center of the corner part 25. More specifically, the pair of third projections 23 are located in line symmetry with the straight line as a central axis. The first projection 19, the second projection 21, and the third projections 23 respectively function as a so-called chip breaker.

In the cutting insert 1 of the present embodiment, the height of the upper end of each of the pair of third projections 23 is the same as the height of the upper end of the second projection 21. The height of the second projection 21, specifically, the height of the second projection 21 from the lower surface 5 is approximately the same as the height of the third projections 23 from the lower surface 5. These configurations reduce the possibility that during the machining at the high feed rates, chips, which are brought into contact with the third projections 23 so as to flow toward the first projection 19, are brought into contact with the second projection 21. This configuration contribute to reducing the possibility that the chips are brought into the upper end of the second projection 21 and the upper end of the second projection 21 is damaged by these chips.

The second projection 21 projects from the first projection 19 toward the corner part 25. Accordingly, the height of the upper end of the second projection 21 is the same as the height of a front end of the first projection 19 from the lower surface 5. Accordingly, the height of the top of the first projection 19, which is continuous with the second projection 21, from the lower surface 5 is the same as the height of the upper end of each of the pair of third projections 23. Therefore, during the machining at the large depths of cut and the high feed rates, chips are brought into contact with the third projections 23 so as to flow toward the first projection 19, and the chips are then brought into contact with the first projection 19. On this occasion, the above-mentioned configurations contribute to reducing the angle formed by the inclined surface of the first projection 19 and the chips. This ensures that the chips are stably contacted with the inclined surface curved in the concave shape in the first projection 19 so as to be deformed.

In the cutting insert 1 of the present invention, the upper ends of the pair of third projections 23 are respectively spaced apart from the first projection 19. Thus, the pair of third projections 23 are configured so as not to merely project from the first projection 19 toward the periphery of the upper surface 3, thereby leaving a recess between the first projection 19 and the third projections 3.

Figure 5:
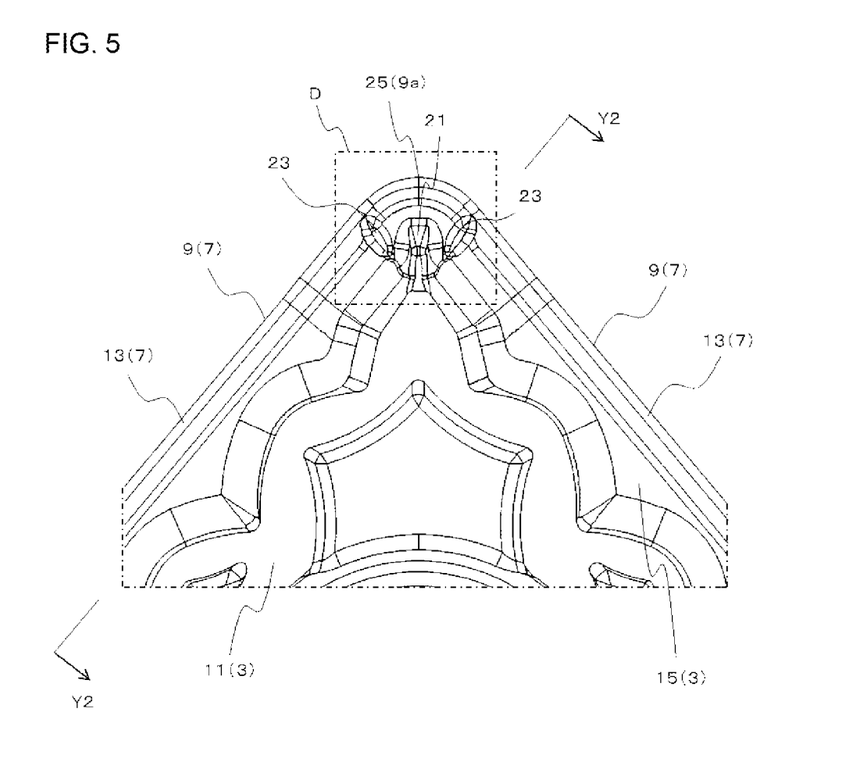
FIG. 5 is an enlarged perspective view showing in enlarged dimension a region C of the cutting insert shown in FIG. 2.

With this configuration, during machining at such a large depth of cut that one end of each chip in a width direction thereof lies on the third projections 23, the chip climbs over the third projection 23 located close to a portion of the corner cutting edge 9a which is brought into contact with the workpiece 201, specifically, the third projection 23 of the pair of third projections 23 which is located on the right side in FIGS. 5 and 6. This chip is to be caught in the recess and then contacted with the first projection 19, thereby making it easier to curve the chip.

Moreover, in the cutting insert 1 of the present embodiment, a width W1 of the inclined surface curved in the concave shape in the first projection 19, in a direction orthogonal to the direction in which the first projection 19 projects, is gradually decreased from a rear end of the inclined surface to a front end thereof. Also, a width W2 of the planar inclined surface of the second projection 21, in a direction orthogonal to the direction in which the second projection 21 projects, is gradually increased from a rear end of the inclined surface to a front end thereof. The width W2 of the planar inclined surface on the side adjacent to the top of the second projection 21 is relatively large, thereby allowing the chips to stably climb over the second projection 21 during the machining at low depths of cut.

The width W2 of the entirety of the planar inclined surface in the second projection 21 is not large, and the width W2 of the planar inclined surface on the rear end side of the second projection 21 is relatively small. It is therefore possible to suppress an excessive increase in space between the pair of third projections 23. Accordingly, it is possible to suppress an excessive increase in distance up to a point at which the chips cut by the corner cutting edge 9a are contacted with the third projections 23. This ensures that the chips are stably deformed when the chips are brought into contact with one of the pair of third projections 23. Additionally, owing to the relatively small width W2 of the planar inclined surface on the rear end side of the second projection 21, it is possible to ensure a large space between the second projection 21 and the cutting edge 9 on the rear end side of the second projection 21. It is therefore ensured to reduce the possibility that the side surface portion of the second projection 21 is clogged with the chips.

As described above, the portion of the first projection 19 which is located on the bisector L of the corner part 25 is curved in the concave shape. Therefore, when the chips are brought into contact with the first projection 19, a larger load from the chips is apt to be applied to the rear end side than the front end side in the portion of the first projection 19 which is located on the bisector L of the corner part 25. However, owing to the relatively large width W1 on the rear end side of the inclined surface curved in the concave shape in the first projection 19, it is possible to increase a contact area with respect to the chips in the region of the rear end of the first projection 19 that is susceptible to the relatively large load. It is therefore possible to disperse the load applied to the first projection 19, consequently improving the durability of the first projection 19.

The width W1 of the entirety of the inclined surface curved in the concave shape in the first projection 19 is not large, and the width W1 of the inclined surface curved in the concave shape on the front end side of the first projection 19 is relatively small. It is therefore possible to suppress an excessive increase in space between the pair of third projections 23. This ensures that the chips are stably deformed when the chips are brought into contact with one of the pair of third projections 23 as described above.

Further, in the cutting insert 1 of the present embodiment, the second projection 21 is located further away from the corner part 25 than a straight line connecting front ends of the pair of third projections 23. Specifically, as shown in FIG. 6, X1 is a straight line which is orthogonal to the direction in which the second projection 21 projects, and which includes a front end of the second projection 21, and X2 is a straight line which is orthogonal to the direction in which the second projection 21 projects, and which includes the front ends of the pair of third projection 23.

Here, the straight line X2 is located closer to the corner part 25 than the straight line X1, thus forming a recessed portion 15a in a region surrounded by the corner cutting edge 9a, the second projection 21, and the pair of third projections 23. The recessed portion 15a constitutes a part of the breaker groove 15. Owing to the recessed portion 15a, the chips that are brought into contact with the third projections 23 are easily deformed by the recessed portion 15a.

In the cutting insert 1 of the present embodiment, the pair of third projections 23 respectively project in a straight line. The term "project in the straight line shape" denotes that a ridge line connecting the front end and the rear end of each of the third projections 23 is formed in the straight line shape. Hence, the third projections 23 are not required to have the straight line shape, and may have an ellipsoidal sphere in which a middle portion extending between the front end side and the rear end side has a wide width as shown in FIGS. 5 and 6, or a shape like a drop shape.

The upper end of each of the third projections 23 in the cutting insert of the present embodiment is curved in a convex shape and the lower end thereof is curved in a concave shape. Therefore, in a cross section that is perpendicular to the lower surface 5 and includes the third projections 23, the surface of an upper end portion including the upper end is indicated by a convex curve, and the surface on a lower end portion being continuous with the breaker groove 15 is indicated by a concave curve.

Thus, the surface on the lower end portion of each of the third projections 23 which is continuous with the breaker groove 15 is curved in the concave shape. Therefore, under conditions of a high feed rate, the chips, which cross over the second projection 21 and contact with the surface of each of the third projections 23, can be easily deformed by the surface curved in the concave shape. Additionally, the surface on the upper end side of each of the third projections 23 is curved in the convex shape. Therefore, under conditions of a higher feed rate, the chips, which flow from the third projections 23 toward the first projection 19, can be smoothly moved toward the first projection 19. It is therefore possible to stably deform the chips on the upper end side of the first projection 19.

In the cutting insert 1 of the present embodiment, the direction in which one of the pair of third projections 23 projects is parallel to a portion of the cutting edge 9 which is located in the direction in which another of the third projections 23 projects. When the third projections 23 are formed in the above manner, the chips can be stably curved by the third projections 23 during machining at such a feed rate that the chips are contacted with the third projections 23. Accordingly, the chips are easily cut to a suitable length, thereby reduce possibility that the chips become too long. The term "parallel" denotes that it is not required to be strictly parallel to each other and a slight inclination of approximately ±5° is included.

The width of the upper surface 3 of the rhombus shape in the longitudinal direction in the cutting insert 1 of the present embodiment is set to, for example, approximately 15 to 25 mm. The width thereof in the direction orthogonal to the longitudinal direction is set to approximately 10 to 22 mm. The size of the lower surface 5 of the rhombus shape is set to the size of the upper surface 3 as described above. The thickness of the cutting insert 1 is set to, for example, approximately 3 to 7 mm.

The term "thickness" denotes a width in a vertical direction extending between a portion of the upper surface 3 which is located uppermost and a portion of the lower surface 5 which is located lowermost, in a side view of the cutting insert 1. For example, in the cutting insert 1 of the present embodiment, the upper end of the upper surface 3 and the lower end of the lower surface 5 are respectively provided with a flat surface that serves as a seating surface when the cutting insert 1 is attached to the holder 103. The width in the vertical direction on these two flat surfaces corresponds to the thickness of the cutting insert 1.

Exemplary sizes of the first projection 19, the second projection 21, and the third projections 23 are as follows. As shown in FIG. 5, the length of the first projection 19 indicated by the direction in which the first projection 19 projects (the vertical direction in FIG. 5) can be set to 0.4 to 1 mm, and the width of the first projection 19 indicated by the direction orthogonal to the above-mentioned direction can be set to 0.3 to 0.6 mm.

The length of the second projection 21 indicated by the direction in which the second projection 21 projects (the vertical direction in FIG. 5) can be set to 0.3 to 0.7 mm, and the width of the second projection 21 indicated by the direction orthogonal to the above-mentioned direction can be set to 0.4 to 0.7 mm. The length of each of the pair of third projections 23 indicated by the direction in which the third projections 23 project can be set to 0.3 to 0.8 mm, and the width of the third projections 23 indicated by the direction orthogonal to the above-mentioned direction can be set to 0.3 to 0.6 mm.

As shown in FIG. 2, the cutting insert 1 of the present embodiment, the shape of the upper surface 3 is the rhombus-shaped square shape in the top plan view, without limitation thereto. For example, the shape of the upper surface 3 may be a polygonal shape, such as a triangular shape, a pentagonal shape, a hexagonal shape, or an octagonal shape in the top plan view.

<Cutting Tool 101>

Next, a cutting tool 101 according to an embodiment of the present invention is described below with reference to the drawings.

Figure 9:
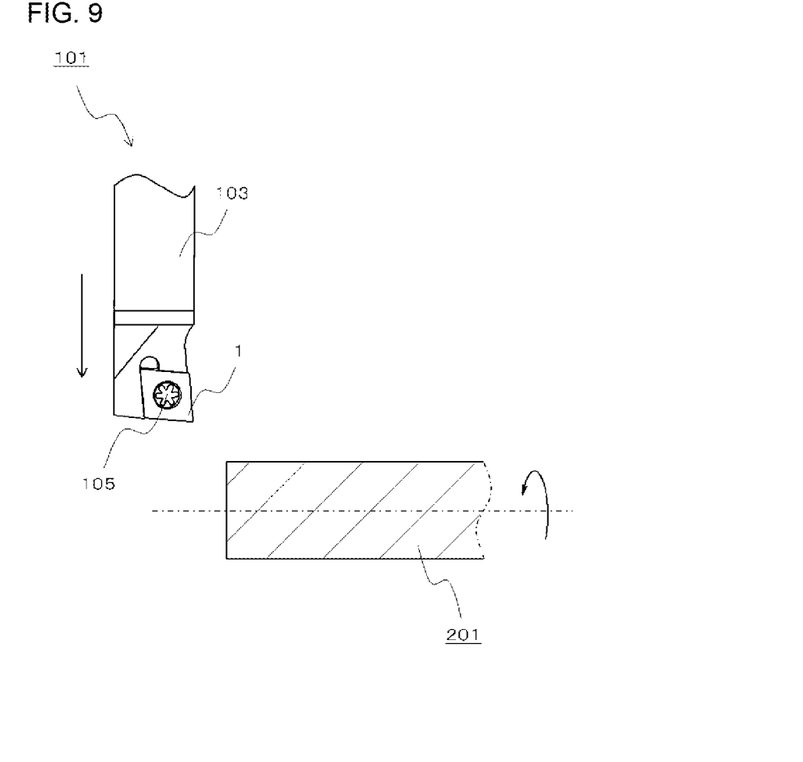
FIG. 9 is a process drawing of a cutting method according to an embodiment of the present invention.
Figure 10:
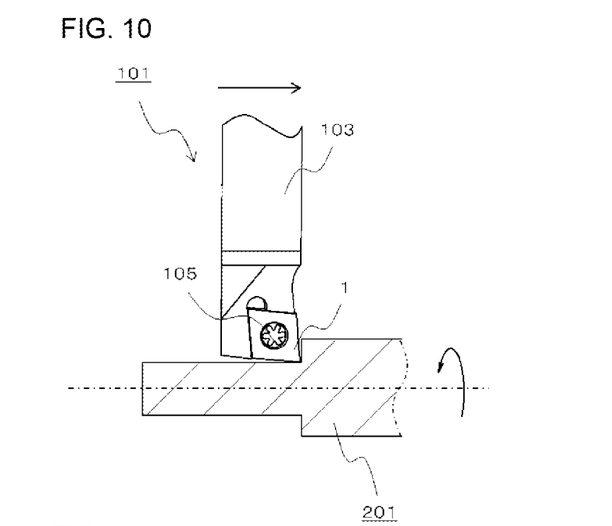
FIG. 10 is a process drawing of the cutting method according to the embodiment of the present invention.
Figure 11:
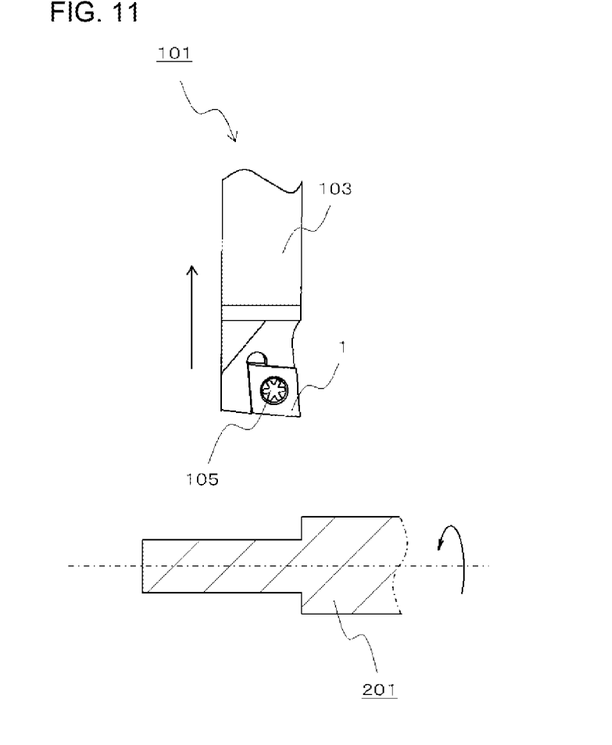
FIG. 11 is a process drawing of the cutting method according to the embodiment of the present invention.

As shown in FIGS. 9 to 11, the cutting tool 101 of the present embodiment includes the cutting insert 1 as represented by the foregoing embodiment, and the holder 103 configured to attach the cutting insert 1 thereto. The holder 103 in the present embodiment has a bar shape, whose one end portion is provided with an insert pocket configured to attach the cutting insert 1 thereto. The cutting insert 1 is to be attached so that the cutting edge 9 projects more outward than the outer periphery of the holder 103.

In the present embodiment, the cutting insert 1 is fixed to the insert pocket by the screw 105. That is, the cutting insert 1 is attached to the holder 103 by inserting the screw 105 into the through hole 17 of the cutting insert 1, and by inserting the front end of the screw 105 into a screw hole (not shown) disposed in the insert pocket so as to screw together screw portions.

Steel, cast iron, or the like is usable for the holder 103. Among others, high-rigidity steel is preferably used.

<Method of Manufacturing Machined Product>

Next, a method of manufacturing a machined product including cutting the workpiece 201 according to an embodiment of the present invention is described with reference to the drawings.

The manufacturing method according to the present embodiment includes the following steps (1) to (3).

(1) As shown in FIG. 9, the step of allowing the cutting tool 101 as represented by the foregoing embodiment to be relatively close to the workpiece 201 in a state in which the workpiece 201 is rotated;

(2) As shown in FIG. 10, the step of bringing the cutting edge 9 of the cutting tool 101 into contact with the workpiece 201 being rotated; and (3) As shown in FIG. 11, the step of separating the cutting tool 101 from the workpiece 201.

The method of manufacturing the machined product according to the present embodiment is applicable to the cutting processes in the wide range of feed rates because the cutting insert 1 includes the first projection 19, the second projection 21, and the third projections 23 respectively have the foregoing characteristic configurations.

In FIG. 9, the workpiece 201 is rotated in a state in which a rotation axis is fixed, and the cutting tool 101 is brought near the workpiece 201. In FIG. 10, the cutting process is performed by bringing the cutting tool 101 into contact with the workpiece 201 in a state in which the workpiece 201 is rotated. In FIG. 11, the workpiece 201 is rotated in a state in which the rotation axis is fixed, and the cutting tool 101 is separated from the workpiece 201. Although in the individual steps of the manufacturing method of the present embodiment, the workpiece 201 is rotated in the state in which the rotation axis is fixed, and the cutting tool 101 is moved. It should be noted that the manufacturing method is not limited to the above-mentioned embodiment.

For example, in the step (1), the workpiece 201 may be brought near the cutting tool 101. In the step (3), the workpiece 201 may be separated from the cutting tool 101. When the cutting process is continued, it is required to repeat the step of bringing the cutting edge 9 of the cutting insert 1 into contact with different portions of the workpiece 201, while holding the rotation of the workpiece 201. When the cutting edge 9 in use is worn, another cutting edge 9 not yet used may be used by rotating the cutting insert 1 through 180° with respect to the central axis of the through hole 17, or by turning the cutting insert 1 upside down.

Representative examples of the material of the workpiece 201 include carbon steel, alloy steel, stainless steel, cast iron, and nonferrous metals.

DESCRIPTION OF THE REFERENCE NUMERAL

1: Cutting insert
3: Upper surface
5: Lower surface
7: Side surface
9: Cutting edge
11: Main part
13: Land part
15: Breaker groove
15a: Recessed portion
17: Through hole
19: First projection
21: Second projection
23: Third projection
25: Corner part
101: Cutting tool
103: Holder
105: Screw
201: Workpiece

The invention claimed is:

1. A cutting insert, comprising:
an upper surface, a lower surface and a side surface located between the upper surface and the lower surface, and a polygonal plate-shaped in which a cutting edge is formed at an intersection of the upper surface and the side surface,
wherein the upper surface comprises a convex-shaped main part comprising a flat upper end surface, a first projection projecting from the main part to a corner part of the upper surface in a top plan view, a second projection projecting from the first projection toward the corner part in the top plan view, and a pair of third projections respectively projecting from the first projection toward a periphery of the upper surface so as to interpose at least a part of the second projection between the pair of third projections in the top plan view, wherein a surface of the first projection is an inclined surface curved in a concave shape, and a surface of the second projection is a planar inclined surface in a portion located on a bisector of the corner part in the top plan view, wherein a width of the inclined surface curved in the concave shape of the first projection in a direction orthogonal to a direction in which the first projection projects is gradually decreased from a rear end of the inclined surface to a front end thereof in the top plan view, and wherein a width of the planar inclined surface of the second projection in a direction orthogonal to a direction in which the second projection projects is gradually increased from a rear end of the inclined surface to a front end thereof in the top plan view.

2. A cutting insert, comprising:

an upper surface, a lower surface and a side surface located between the upper surface and the lower surface, and a polygonal plate-shaped in which a cutting edge is formed at an intersection of the upper surface and the side surface, wherein the upper surface comprises a convex-shaped main part comprising a flat upper end surface, a first projection projecting from the main part to a corner part of the upper surface in a top plan view, a second projection projecting from the first projection toward the corner part in the top plan view, and a pair of third projections respectively projecting from the first projection toward a periphery of the upper surface so as to interpose at least a part of the second projection between the pair of third projections in the top plan view, wherein a surface of the first projection is an inclined surface curved in a concave shape, and a surface of the second projection is a planar inclined surface in a portion located on a bisector of the corner part in the top plan view, and wherein each of the pair of third projections is configured to have a surface curved in a convex shape on a region adjacent to an upper end of the third projection and a surface curved in a concave shape on a region adjacent to a lower end thereof.

3. The cutting insert according to claim 2, wherein a height of an upper end of each of the pair of the third projections is identical with a height of an upper end of the second projection.

4. The cutting insert according to claim 2, wherein an upper end of each of the pair of third projections is spaced apart from the first projection.

5. The cutting insert according to claim 2, wherein the second projection is located further away from the corner part than a straight line connecting front ends of the pair of third projections.

6. The cutting insert according to claim 2, wherein a direction in which one of the pair of third projections projects is approximately parallel to a portion of the cutting edge which is located in a direction in which another of the pair of third projections projects in the top plan view.

7. A cutting tool, comprising:
a cutting insert according to claim 2; and
a holder configured to attach the cutting insert thereto.

8. A method of manufacturing a machined product, comprising:
rotating a workpiece;
bringing the cutting edge of the cutting tool according to claim 7 into contact with the workpiece being rotated; and
separating the cutting tool from the workpiece.

* * * * *